March 2, 1965  TADASHI MOROKUMA  3,171,881
INTERFERENCE COMPARATOR SYSTEM
Filed Sept. 21, 1961
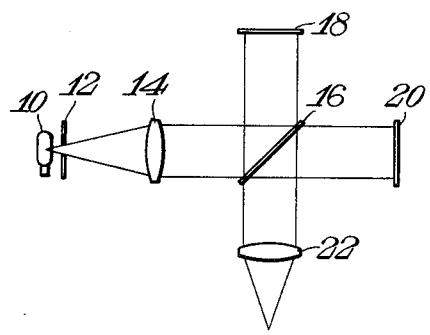
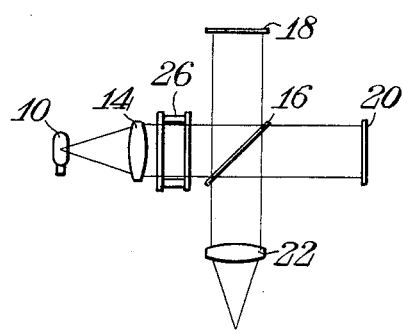
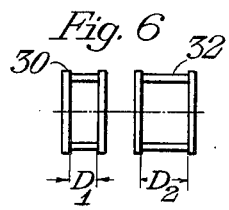
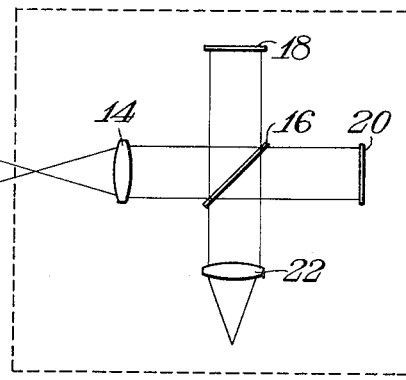
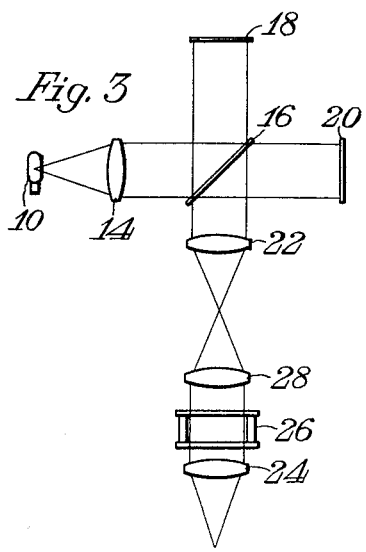
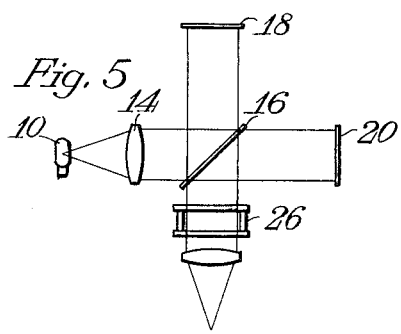

United States Patent Office 3,171,881
Patented Mar. 2, 1965

3,171,881
INTERFERENCE COMPARATOR SYSTEM
Tadashi Morokuma, Tokorozawa, Japan, assignor to Olympus Kogaku Kogyo Kabushiki-Kaisha, Tokyo, Japan, a corporation of Japan
Filed Sept. 21, 1961, Ser. No. 139,687
Claims priority, application Japan, Nov. 24, 1960, 35/46,621
6 Claims. (Cl. 88—14)

This invention relates to an interference comparator system.

In the past, it has frequently been the practice to precisely measure lengths of articles to be measured by using optical interferometers of certain types. It is desirable to provide an optical interferometer by which the length of an article to me measured can be inexpensively determined within a short period of time.

An object of the invention is, therefore, to provide an interference comparator system which can be used with an electrical lamp readily available in the market, such as mercury vapor lamp or cadmium lamp etc. and which can inexpensively measure the length of an article to be measured.

Another object of the invention is to provide an interference comparator system capable of measuring a relatively long length of an article to be measured with the measured result not being affected by ambient conditions such as temperature, atmospheric pressure etc.

According to the invention there is provided an interferometric comparator system of the Michelson type comprising means for causing a wavelength of a ray of light passing therethrough at an angle of $\theta$ with respect to the optical axis to be equal to $\lambda \cos \theta$, where $\lambda$ is a wavelength of a ray of light passing therethrough along the optical axis whereby a pair of coherent rays of light produced by said system have a phase difference therebetween which is not affected by the inclination of the rays with respect to the optical axis of the system.

The abovementioned means may preferably comprise at least one Fabry-Pérot etalon including a pair of plane parallel plates having a relatively high coefficient of reflectivity and a spacer for maintaining the pair of plane parallel plates in a predetermined spaced relationship.

In order to eliminate the effect of ambient temperature and/or atmospheric pressure and/or the like upon measurment of the length of an article to be measured, said spacer may be formed of any suitable material having its coefficient of thermal expansion substantially equal to or approximating that of a material of which the article is formed.

The Fabry-Pérot etalon may be disposed on either the entrance or exit side of an interferometer.

The invention will become more apparent from the following detailed description taken in conjunction with the accompanying drawings in which:

FIG. 1 shows diagrammatically one optical system used in a conventional optical interferometer for measuring lengths;

FIG. 2 is a diagrammatical view illustrating an optical system constructed in accordance with the teachings of the invention;

FIGS. 3 through 5 are diagrammatical views of different interference comparator systems constructed in accordance with the teachings of the invention; and FIG. 6 shows schematically an elevational view of a pair of Fabry-Pérot etalons used with the invention.

Throughout the drawings similar reference numerals designate like components.

Referring now to FIG. 1 of the drawings, there is shown diagrammatically one optical system used in the conventional optical interferometer for measuring lengths. A ray of light from a source of light 10 passes through a pinhole 12 to an entrance collimator lens 14 which, in turn converts rays of light emitted from a point on the source of light and incident upon the lens 14 into a beam of substantially parallel rays. The parallel ray beam falls at an angle of 45° upon a beam splitter such as a half-silvered plane mirror 16 where it is split up into a reflected beam which passes to a stationary or reference plane mirror 18 and a transmitted beam which passes to a movable plane mirror 20. These mirrors 18 and 20 reflect the beams back to the mirror 16 where the first beam is transmitted while the second beam is reflected. Thus the two rays come into interference on the mirror 16 which can be observed in the field of a focussing exit lens or an eyepiece 22. The interference fringes observed in the field of the eyepiece 12 are moved across a reference mark (not shown) by one fringe for each movement of the movable mirror 20 corresponding to a half wavelength of light emanating from the source 10. It is well known that, as a movable mirror such as that above described is moved an interference fringe has its brightness periodically varied with a period corresponding to the displacement $\lambda/2$ of the mirror 20 where $\lambda$ is the wavelength of light emanating from a source of light. Therefore, by counting the number of moved interference fringes by counting changes in brightness of the fringe the amount of displacement of the movable mirror can be determined.

An apparatus for measuring lengths by interferences includes a suitable measuring terminal (not shown) such as a spindle or a reading microscope or the like attached to the movable mirror above-mentioned.

The maximum possible distance measured by such an apparatus depends upon the width of the spectral line which is provided by a source of light and generally is small. To increase this distance an electrical lamp of special construction such as Megger's lamp must be used. Also, as compared with the ordinary materials a wavelength of light is much less affected by ambient temperature but more affected by atmospheric pressure. Accordingly, a high accuracy with such interference measurement can not be expected unless external conditions such as ambient temperature, atmospheric pressure etc. are set at a standard state. Although temperature, atmospheric pressure and the like could be precisely set, a complicated and sizable piece of equipment is required for this purpose and a long period of time is required for setting temperature. For this reason any conventional interferometer comparator is unfit for industrial purposes unless it can inexpensively perform measurement of length within a short period of time.

The invention is designed to avoid the drawbacks above described.

Referring now to FIG. 2 of the drawings, there is diagrammatically illustrated an optical system constructed in accordance with the teachings of the invention. As seen in FIG. 2, a ray of light from a point on a source of light 10 passes to a collimator lens 24 where it is converted into a beam of substantially parallel rays which, in turn passes through the Fabry-Pérot etalon 26 to a focussing lens 28. The beam focussed by the lens 28 is passed through an entrance collimator lens 14 to be again converted into a substantially parallel beam of rays which, in turn is utilized in the same manner as that previously described in conjunction with FIG. 1. In FIG. 2, a dotted block designates a conventional interference comparator such as shown in FIG. 1. Preferably, the focussing lens 28 has a focal length substantially equal to that of the collimator lens 14 and both of the lenses are arranged such that they have their foci at a common point respectively.

The Fabry-Pérot etalon 26 comprises a pair of plane parallel plates made of any suitable material having a relatively high coefficient of reflectivity and disposed in parallel relationship to each other, and a spacer for maintaining the plane parallel plates in a predetermined spaced relationship. With the etalon made of a material having a suitably high coefficient of reflectivity and including a suitably large distance between the pair of plane parallel plates, a ray of light transmitted in a direction inclined at an angle of $\theta$ to the optical axis thereof will have a wavelength of $\lambda \cos \theta$ where $\lambda$ is a wavelength of a ray of light transmitted along the optical axis. Further, the ray transmitted in that direction exhibits a spectral line having a width capable of being far smaller than the ray emanating from the source of light. With the arrangement illustrated, a ray of light passing through the Fabry-Pérot etalon at the angle of $\theta$ with respect to the optical axis thereof is also arranged to have an inclination of $\theta$ with respect to the optical axis of the interferometer illustrated within the dotted line.

It is well known to those skilled in the art that, if $d_0$ represents a difference between paths of rays of light transmitted through an interferometer in the direction $\theta=0$, an optical path-difference $d_\theta$ for rays of light transmitted through the same at an inclination of $\theta$ is represented by the expression $$d_\theta = d_0 \cos \theta$$

Accordingly, the corresponding phase difference $\varphi_\theta$ is represented by the expression $$\varphi_\theta = 2\pi n d_\theta / \lambda_\theta = 2\pi n d_0 = \varphi_0$$

where $n$ is an index of refraction of a medium through which the rays are transmitted and $\varphi_0$ is a phase difference between such rays when $\theta=0$. In other words, the phase difference is not affected by any inclination of the ray of light.

In the conventional interferometer, however, $\varphi_\theta$ is not equal to $\varphi_0$. In order to form interference fringes of high contrast when the phase difference is large, it is necessary to dispose a pinhole at a focus of a collimator lens to thereby limit the cross sectional area of a beam of light passing therethrough.

On the contrary, the invention permits such limitation to be overcome to a great extent. However, such limitation can not be overcome without any restriction by virtue of the properties of an etalon used. More specially, the dimension of the pinhole must be determined such that, if an etalon has a spacing denoted by D between a pair of plane parallel plates, any ray of light having an inclination larger than $\sqrt{\lambda_0/D}$ radians is not passed through the pinhole. The dimension of the pinhole thus determined is far larger than that obtained under the conditions for improving contrast. A limited overcoming of the limitation as to the dimension of the pinhole is advantageous for the purpose of forming bright interference fringes and is particularly effective when the interference fringes are subjected to photometry utilizing a photocell.

Further, it is required that the width of a spectral line of light emanating from a source of light not exceed $\lambda^2/2D$.

Also, according to the invention, a spacer of an etalon can be made of any suitable material having a coefficient of thermal expansion substantially equal to or approximating that of a material of which an article to be measured is formed. This allows the ratio of the length of the article to a wavelength of light transmitted through the etalon to remain fixed within suitable limits of temperatures. In other words, any change in temperature causes a corresponding variation in the length of the spacer and hence in the wavelength of light transmitted through the etalon. As any variation in the wavelength of the transmitted light is proportional to a variation in the length of the spacer, any change in the length of the article to be measured is proportional to that wavelength. For this reason, the ratio of the length of the article to the wavelength of light transmitted through the etalon remains unchanged regardless of the change in temperature. It is, however, noted that this change in temperature should be within a range wherein a change in the distance between the pair of plane parallel plates of the etalon is at most equal to a half wavelength of light used and thus is not unlimited.

In addition, it will be apparent that the measured data are not at all affected by any change in atmospheric pressure for the reasons similar to those above described.

From the foregoing it is apparent that the invention involves the following technical ideas:

(1) By causing a wavelength of a ray of light inclined at an angle of $\theta$ with respect to an optical axis of an interferometer to be equal to $\lambda \cos \theta$, it is ensured that a phase difference between rays of light transmitted through the interferometer is not dependent upon the inclination of the same; and (2) By changing the wavelength of light in accordance with any variation in temperature and/or atmospheric pressure and/or the like, it is ensured that the phase difference between the rays of light transmitted through the interferometer is not affected by such variation.

Referring now to FIG. 3 of the drawings, there is diagrammatically illustrated a modified arrangement according to the invention. As shown in FIG. 3 the Fabry-Pérot etalon 26 and the associated lenses 24 and 28 are disposed on an exit side of an interferometer. As in the arrangement shown in FIG. 2, the lenses 28 and 22 have their focal lengths equal to each other and are arranged to have their foci at a common point respectively. A ray of light emerging from the lens 22 in any direction has different wavelengths. After having passed through the lens 28 and the etalon 26, the rays of light have a wavelength of $\lambda \cos \theta$ alone. Thus the same conditions as that previously described in conjunction with FIG. 2 are also produced in the arrangement shown in FIG. 3.

In FIGS. 4 and 5 there are illustrated modifications of the invention in which an etalon is disposed in an optical path within an interferometer with the modification of FIG. 4 including the etalon disposed in the entrance portion while the modification of FIG. 5 includes the etalon disposed in the exit portion of the interferometer. In these cases, lenses such as the lenses 28 and 14 shown in FIG. 2 are omitted. More specially, a beam of light transmitted through the etalon is passed to a beam splitter 16 such as a half-silvered mirror without any change in the travelling direction thereof. Accordingly, the above-mentioned idea (1) is clearly realized. This is also true in the case of the arrangement shown in FIG. 5.

The foregoing description has been directed to the use of a single Fabry-Pérot etalon. As already described, the effect of the limitations as to the dimension of a pinhole, any variation in temperature, any change in atmospheric pressure etc. are greatly reduced as compared with the prior art methods but can not be completely eliminated. However, the effect of such limitations can be further reduced by using a pair of etalons having different spacings between the respective pairs of plane parallel plates and disposed one after another as shown in FIG. 6. It is assumed that a beam of light is first transmitted through an etalon 30 and then through an etalon 32.

The etalon 32 is designed and constructed such that the spacing $D_2$ between a pair of plane parallel plates and its coefficient of reflectivity are sufficient to make the width of a spectral line of light transmitted through the etalon smaller than the width of a spectral line necessary for obtaining a desired distance to be measured or a desired distance within which a pair of coherent beams may interfere with each other. The etalon 30 is designed and constructed such that the spacing $D_1$ between a pair of plane parallel plates and its coefficient of reflectivity are sufficient to make the width of a spectrum line of light transmitted through the etalon smaller than $\lambda^2/2D_2$ and to make the spacing $D_1$ smaller than the spacing $D_2$. In this way, the effect of the limitation as to the pinhole can be reduced by a factor of $\sqrt{D_2/D_1}$ as compared with the case where a single etalon is used. Similarly, the effects of change in temperature and/or in atmospheric pressure can be reduced by a factor of $D_2/D_1$. Also, in order to further reduce the effect of such limitation three or more etalons can be used. With at least a pair of etalons it is understood that one of the etalons can be disposed on an entrance side of an interferometer while the other etalon can be disposed on the exit side of the interferometer.

While the invention has been described in conjunction with several embodiments thereof, it is to be understood that various changes and modifications may be made without departing from the spirit and scope of the invention.

What I claim is:

1. In an interference comparator system comprising a source of light, collimating entrance means for converting a beam of light emitted from a point on said source of light and incident thereupon into a substantially parallel beam, beam splitter means for splitting said substantially parallel beam into a reflected beam portion and a transmitted beam portion, reference mirror means for reflecting said reflected beam portion to said beam splitter means, movable mirror means for reflecting said transmitted beam portion to said beam splitter means and adapted to be moved toward and away from said beam splitter means, both beam portions reflected from the reference and movable mirror means respectively being adapted to form an interfering light beam, and focusing exit lens means for focusing said interfering light beam; the provision of means for causing a wavelength of a beam of light transmitted therethrough at an angle of $\theta$ with respect to the optical axis to be equal to $\lambda \cos \theta$ where $\lambda$ is a wavelength of a beam of light transmitted therethrough along the optical axis whereby the reflected and transmitted beam portions as returned to the beam splitter means have a phase difference therebetween not affected by an inclination of the beam portions with respect to the optical axis of the system.

2. In an interference comparator system comprising a source of light, collimating entrance lens means for converting a beam of light emitted from a point of said source of light and incident thereupon into a substantially parallel beam, beam splitter means for splitting said substantially parallel beam into a reflected beam portion and a transmitted beam portion, reference mirror means for reflecting said reflected beam portion to said beam splitter means, movable mirror means for reflecting said transmitted beam portion to said beam splitter means and adapted to be moved toward and away from said beam splitter means, both beam portions reflected from the reference and movable mirror means respectively being adapted to form an interfering light beam, and focusing exit lens means for focusing said interfering light beam; the provision of at least one Fabry-Pérot etalon disposed on the entrance side of said interference comparator system and including a spacer made of a material having its coefficient of thermal expansion at least approximating that of a material forming an article to be measured.

3. In an interference comparator system comprising a source of light, collimating entrance lens means for converting a beam of a light emitted from a point on said source of light and incident thereupon into a substantially parallel beam, beam splitter means for splitting said substantially parallel beam into a reflected beam portion and a transmitted beam portion, reference mirror means for reflecting said reflected beam portion to said beam splitter means, movable mirror means for reflecting said transmitted beam portion to said beam splitter means and adapted to be moved toward and away from said beam splitter means, both beam portions reflected from the reference and movable mirror means respectively being adapted to form an interfering light beam, and focussing exit lens means for focussing said interfering light beam the provision of at least one Fabry-Pérot etalon disposed on the exit side of said interference comparator system and including a spacer made of a material having its coefficient of thermal expansion at least approximating that of a material forming an article to be measured.

4. In an interference comparator system comprising a source of light, collimating entrance lens means for converting a beam of light emitted from a point on said source of light incident thereupon into a substantially parallel beam, beam splitter means for splitting the said substantially parallel beam into a reflected beam portion and a transmitted beam portion, reference mirror means for reflecting said reflected beam portion to said beam splitter means, movable mirror means for reflecting said transmitted beam portion to said beam splitter means and adapted to be moved toward and away from said beam splitter means, both beam portions reflected from the reference and movable mirror means respectively being adapted to form an interfering light beam, and focussing exit lens means for focussing said interfering light beam; the provision of at least one Fabry-Pérot etalon disposed between said collimating entrance lens means and said beam splitter means and including a spacer made of a material having its coefficient of thermal expansion at least approximating that of a material forming an article to be measured.

5. In an interference comparator system comprising a source of light, collimating entrance lens means for converting a beam of light emitted from a point on said source of light and into a substantially parallel beam, beam splitter means for splitting the said substantially parallel beam into a reflected beam portion and a transmitted beam portion, reference mirror means for reflecting said reflected beam portion to said beam splitter means, movable mirror means for reflecting said transmitted beam portion to said beam splitter means and adapted to be moved toward and away from said beam splitter means, both beam portions reflected from the reference and movable mirror means respectively being adapted to form an interfering light beam, and focussing exit lens means for focussing said interfering light beam; the provision of at least one Fabry-Pérot etalon disposed between said beam splitter means and said focussing exit lens means and including a spacer made of a material having its coefficient of thermal expansion at least approximating that of a material forming an article to be measured.

6. In an interference comparator system comprising a source of light, collimating entrance means for converting a beam of light emitted from a point on said source of light and incident thereupon into a substantially parallel beam, beam splitter means for splitting said substantially parallel beam into a reflected beam portion and a transmitted beam portion, reference mirror means for reflecting said reflected beam portion to said beam splitter means, movable mirror means for reflecting said transmitted beam portion to said beam splitter means and adapted to be moved toward and away from said beam splitter means, both beam portions reflected from the reference and movable mirror means respectively being adapted to form an interfering light beam, and focussing exit lens means for focussing said interfering light beam; the combination of at least a pair of Fabry-Pérot etalons, each including a spacer made of a material having its coefficient of thermal expansion at least approximating that of a material forming an article to be measured, one of said etalons being disposed on the entrance side of the system, the other etalon being disposed on the exit side of the system.

References Cited by the Examiner

Koronkevich et al.: "Photoelectric Method of Recording an Achromatic Interference Fringe," Optics and Spectroscopy, vol. XI, No. 1, July 1961.

National Physical Laboratory Symposium No. 11, "Interferometry" (symposium held on 9th, 10th, 11th June 1959). Printed in London by Her Majesty's Stationery Office in 1960. Pages 111–115 relied on.

FREDERICK M. STRADER, *Primary Examiner.*
EMILE G. ANDERSON, JEWELL H. PEDERSEN,
*Examiners.*